(12) United States Patent
Madan et al.

(10) Patent No.: US 8,619,572 B2
(45) Date of Patent: Dec. 31, 2013

(54) SCHEDULING BEST EFFORT FLOWS IN BROADBAND WIRELESS NETWORKS

(75) Inventors: Ritesh K. Madan, Jersey City, NJ (US);
Arnab Das, Bethesda, MD (US);
Sundeep Rangan, Jersey City, NJ (US);
Siddharth Ray, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 12/261,335

(22) Filed: Oct. 30, 2008

(65) Prior Publication Data

US 2009/0116390 A1    May 7, 2009

Related U.S. Application Data

(60) Provisional application No. 60/985,549, filed on Nov. 5, 2007.

(51) Int. Cl.
*G01R 31/08* (2006.01)

(52) U.S. Cl.
USPC .......................................................... 370/235

(58) Field of Classification Search
USPC ................. 370/203, 310–337, 395.4, 395.41, 370/395.42, 395.43, 395.61, 395.65, 370/204–215, 229–253, 395.3, 395.5, 370/395.52, 431–529, 523–520
See application file for complete search history.

(56) References Cited

U.S. PATENT DOCUMENTS

| 7,349,338 B2 * | 3/2008 | Balachandran et al. | 370/232 |
| 7,496,367 B1 * | 2/2009 | Ozturk et al. | 455/453 |
| 2003/0104817 A1 * | 6/2003 | Damnjanovic | 455/452 |
| 2003/0223451 A1 * | 12/2003 | Bi et al. | 370/441 |
| 2006/0057994 A1 | 3/2006 | Anand | |
| 2008/0069046 A1 | 3/2008 | Ishii et al. | |

FOREIGN PATENT DOCUMENTS

| EP | 1370035 A1 | 12/2003 |
| JP | 2004040786 A | 2/2004 |
| JP | 2004312190 A | 11/2004 |
| JP | 2005505993 A | 2/2005 |
| JP | 2009506600 A | 2/2009 |
| WO | WO03032586 | 4/2003 |
| WO | WO2005109787 A1 | 11/2005 |
| WO | WO2006081570 | 8/2006 |
| WO | WO2007022817 A1 | 3/2007 |

OTHER PUBLICATIONS

Hosein, et al: "Simple fairness metric for time-shared wireless data networks," Personal Wireless Communications, 2005. ICPWC 2005 IEEE Intl Ional Conference, New Delhi, India, Jan. 23-25, 2005. IEEE, Piscataway, NJ, US, Jan. 23, 2005, pp. 34-37, ISBN: 978-0-7803-8964-9.
International Search Report and Written Opinion—PCT/US08/082436—International Search Authority EPO—Mar. 31, 2009.
Taiwan Search Report—TW097142802—TIPO—Mar. 1, 2012.

\* cited by examiner

*Primary Examiner* — Jung-Jen Liu
(74) *Attorney, Agent, or Firm* — Donald C. Kordich

(57) ABSTRACT

Systems and methodologies are described that facilitate scheduling best effort flows in broadband or wideband wireless communication networks. The systems can include devices and/or component that effectuate associating utility functions to multiple disparate flows based on traffic conditions extant in the wireless system, ascertaining the average rate at which the flow has been serviced in the past, and utilizing the utility function associated with the flow or the average rate that the flow has been serviced in the past to optimally schedule the flow.

30 Claims, 9 Drawing Sheets

SCHEDULING BEST EFFORT FLOWS IN BROADBAND WIRELESS NETWORKS

CROSS-REFERENCE TO RELATED APPLICATIONS

This application claims the benefit of U.S. Provisional Patent application Ser. No. 60/985,549 entitled "SCHEDULING BEST EFFORT FLOWS IN BROADBAND WIRELESS NETWORKS" which was filed Nov. 5, 2007. The entirety of the aforementioned application is herein incorporated by reference.

BACKGROUND

I. Field

The following description relates generally to wireless communications, and more particularly to the scheduling of best effort flows in broadband wireless communication networks.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In wireless data systems, a scheduling policy should typically compute an allocation of power and bandwidth to different flows to ensure fairness between elastic flows, meet Quality of Service (QoS) constraints, and exploit multi-user diversity to name but a few. Traditionally, scheduling algorithms for wireless systems that have at least the above characteristics are geared towards giving a single flow the entire bandwidth at any given time. Such a policy typically is good for narrowband systems, where the amount of bandwidth available at each time is relatively small. However, for wideband systems, for scheduling policy to be optimal, the bandwidth at each time may need to be shared between multiple flows. In general, any policy which is suitable for scheduling a single user in a frame can be modified to the wideband case—simply by running the policy on small amounts of spectral resource (e.g., each tile in a frame in Ultra Mobile Broadband (UMB). Nevertheless, this can require a lot of computation in every frame.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating the scheduling of best effort flows in broadband wireless communication environments. The systems and methodologies in accordance with an aspect of the claimed subject matter provide for an apparatus operable in a wireless broadband communication system wherein the apparatus includes a processor configured to associate a utility function to a flow based on traffic conditions extant in the wireless broadband communication system, investigate an average rate that the flow has been serviced by the apparatus in the past, and utilize the utility function associated with the flow or the average rate that the flow has been serviced by the apparatus in the past to optimally schedule the flow, and a memory coupled to the processor for persisting data.

In accordance with a further aspect of the claimed subject matter, an apparatus operable in a wideband wireless communication system is provided. The apparatus includes a memory that retains instructions related to associating a utility function to a flow based at least in part on traffic conditions extant in the wireless wideband communication system, investigating an average rate that the flow has been serviced by the apparatus in the past, and utilizing the utility function associated with the flow or the average rate that the flow has been serviced by the apparatus in the past to optimally schedule the flow, and a processor, coupled to the memory, configured to execute the instructions retained in the memory.

Additionally, in accordance with yet a further aspect of the claimed subject matter, a machine-readable medium having stored thereon machine-executable instructions for associating a utility function to a flow based in part on traffic conditions extant in a wireless broadband communication system, investigating an average rate that the flow has been serviced in the past by an apparatus included in the wireless broadband communication system, and utilizing the utility function associated with the flow or the average rate that the flow has been serviced by the apparatus in the past to optimally schedule the flow, is set forth herein.

Moreover, in accordance with a further aspect of the claimed subject matter, an apparatus operable in a wireless communication system is disclosed. The apparatus includes means for associating a utility function to a flow based at least in part on traffic conditions extant in the wireless communication system, means for investigating an average rate that the flow has been serviced in the past by the apparatus included in the wireless communication system, and means for utilizing the utility function associated with the flow or the average rate that the flow has been serviced by the apparatus in the past to optimally schedule the flow.

Furthermore, in accordance with yet a further aspect of the claimed subject matter, a computer program product is provided. The computer program product includes computer-readable media that comprises a first set of codes for causing a computer to associate a utility function to a flow based at least in part on traffic conditions extant in a wireless broadband communication system, a second set of codes for causing the computer to investigate an average rate that the flow has been serviced by the computer in the past, and a third set of codes for causing the computer to utilize the utility function associated with the flow or the average rate that the flow has been serviced by the apparatus in the past to optimally schedule the flow.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
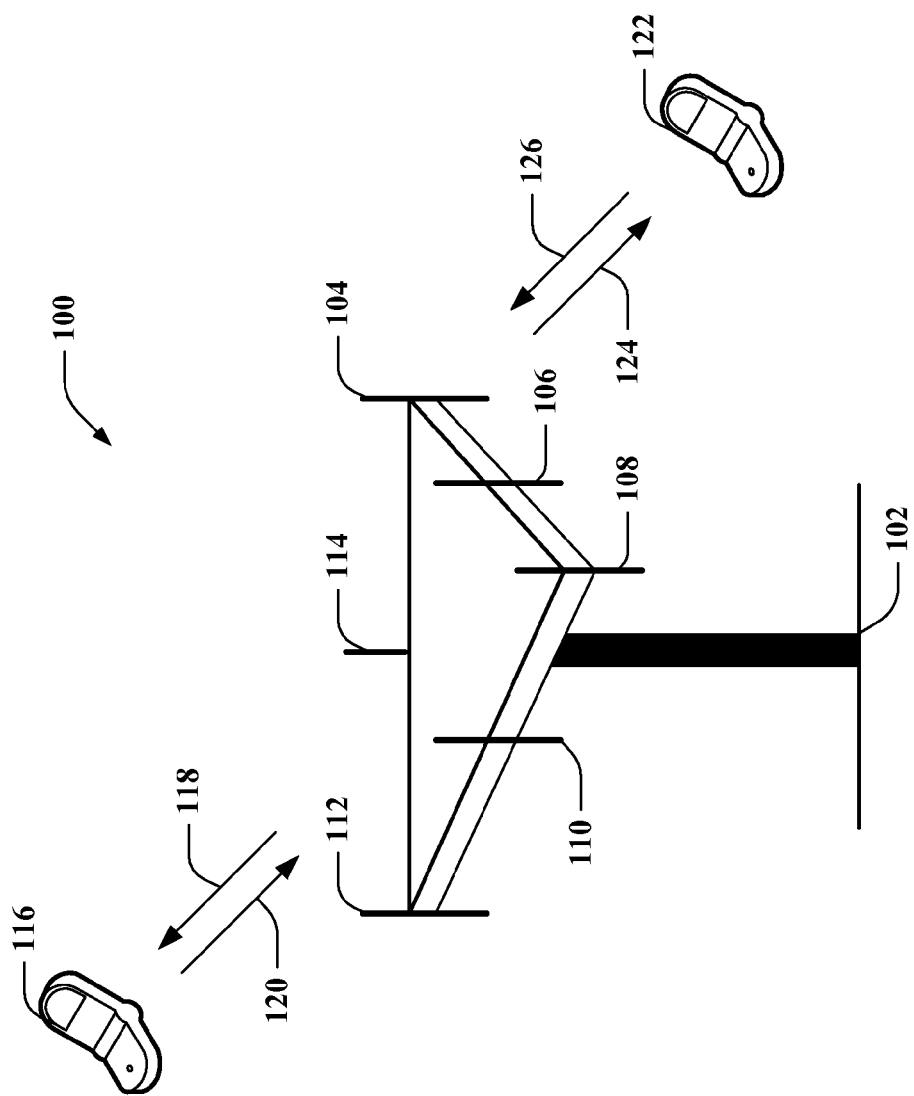
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
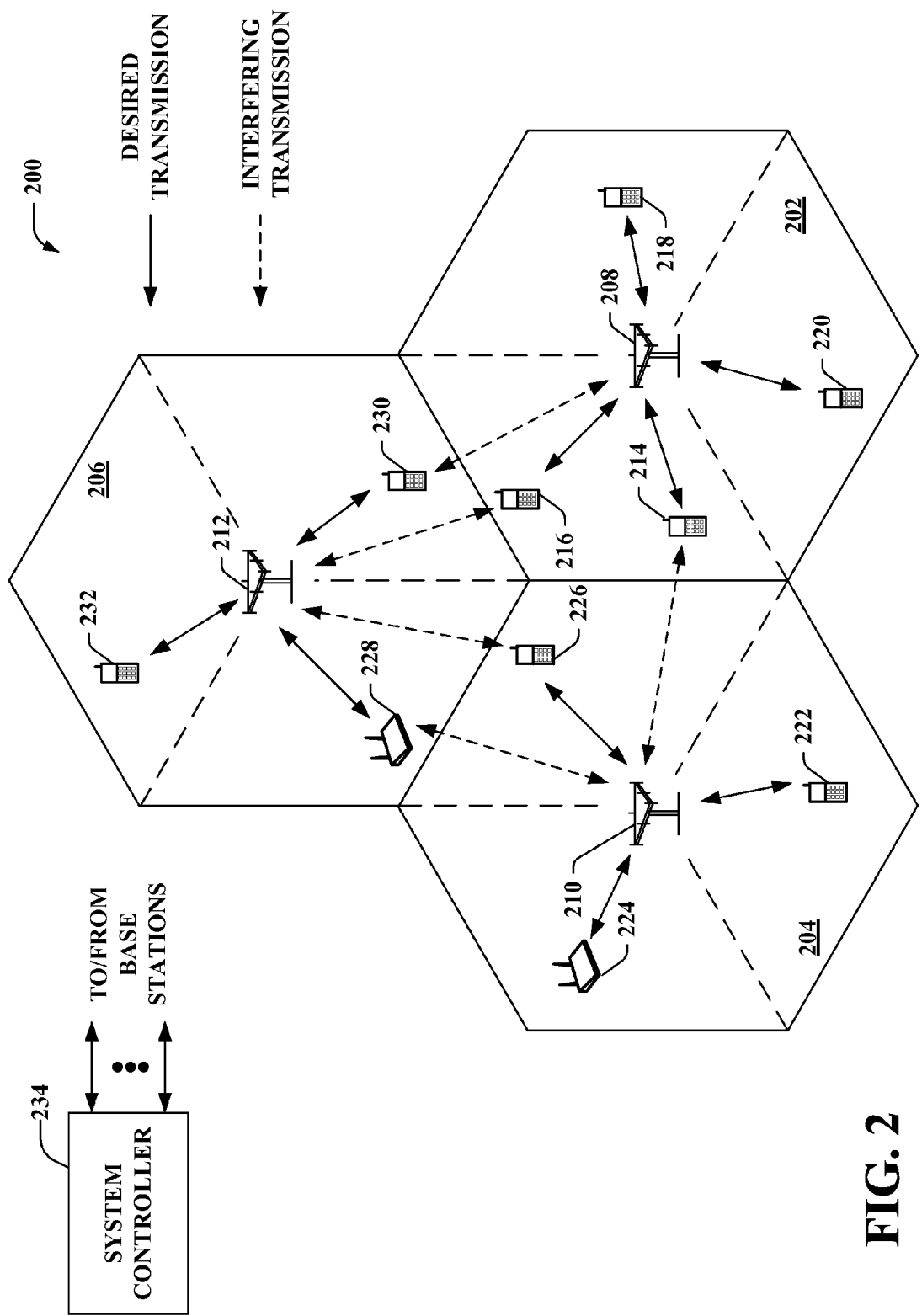
FIG. 2 is an illustration of an example multiple access wireless communication system according to various embodiments for signal transmission.

FIG. 2 illustrates a multiple access wireless communication system 200 according to various embodiments for signal transmission. Multiple access wireless communication system 200 can include multiple cells (e.g., cell 202, cell 204, and cell 206). As depicted, each cell 202-206 can include a respective base station 208, 210, 212, which can include one or more sectors. The sectors can be formed by groups of antennas, each responsible for communication with access terminals in a portion of the cell.

Each cell 202-206 can include a plurality of access terminals, which can be in communication with one or more sectors of each base station 208-212. For example, access terminals 214, 216, 218, and 220 are in communication with base station 208, access terminals 222, 224, and 226 are in communication with base station 210, and access terminals 228, 230, and 232 are in communication with base station 212.

As illustrated in cell 204, for example, each access terminal 222, 224, and 226 can be located at a different position within cell 204. For instance, each access terminal 222, 224, and 226 can be at a different distance from the corresponding antenna group with which it is communicating. These factors, along with environmental and other conditions, can cause different channel conditions to be present between each access terminal 222, 224, and 226 and its corresponding antenna group with which it is communicating. Similarly, disparate channel conditions can be experienced between other access terminals (e.g., access terminals 214-220, 228-232, . . . ) and corresponding antenna groups with which they respectively communicate.

In accordance with some aspects, access terminals in a particular cell can be in communication with the base station associated with that cell and, at substantially the same time, be interfering with another base station associated with a different cell. For example, access terminal 214 can be in communication with base station 208 and can interfere with base station 210, access terminal 216 can be in communication with base station 208 and can interfere with base station 212, access terminal 226 can be in communication with base station 210 and can interfere with base station 212, access terminal 228 can be in communication with base station 212 and can interfere with base station 210, and access terminal 230 can be in communication with base station 212 and can interfere with base station 208.

A controller 234 can be coupled to each of cells 202, 204, and 206. Controller 234 can include one or more connections to one or more networks, such as the Internet, packet-data based networks, and/or circuit-switched voice networks, which provide information to, and from, access terminals in communication with the cells of multiple access wireless communication system 200. Controller 234 can include, or is coupled to, a scheduler configured to schedule transmission from and to access terminals. In some embodiments, scheduler can reside in each individual cell, each sector of a cell, or a combination thereof.

A cell can refer to a coverage area serviced by a base station. A cell can further include one or more sectors. For simplicity and clarity, the term "sector" can be used herein to refer to a cell, or a section of a cell, serviced by a base station. The terms "access terminal" and "user" can be used interchangeably, and the terms "sector" and "base station" can also be used interchangeably. A serving base station/sector can refer to a base station/sector with which an access terminal communicates.

As shown in system 200, each sector can receive "desired" transmissions from access terminals within the sector as well as "interfering" transmissions from access terminals in other sectors. The total interference observed at each sector includes 1) intra-sector interference from access terminals within the same sector and 2) inter-sector interference from access terminals in other sectors. Intra-sector interference can be substantially eliminated using OFDMA transmission from the access terminals, which ensures orthogonality between transmissions of different access terminals in the same sector. The inter-sector interference, which is also called other sector interference (OSI), results from the transmissions in one sector not being orthogonal to the transmissions in the other sectors.

Typically resource allocation in wireless systems is done on a frame-by-frame basis. During each frame, the scheduling algorithm computes a resource allocation across flows which can be a function of the flow class (e.g., best effort or delay sensitive), the average rate that the flow has been serviced during the recent past, the number of bytes in the buffer, packet delay, and the like.

As will be appreciated by those moderately conversant in this field of endeavor, there can be disadvantages to this approach. For instance, in high data rate systems, each frame can be as small as 1 millisecond (e.g., 1 ms), of which a small fraction can be available to compute resource allocation. In such situations the resource allocation policy can be limited to only computationally lightweight policies. A further disadvantage is that a user's assignments can be split over multiple frames. For example, a user may require a certain amount of bandwidth in a current frame, and additional bandwidth after 3 ms. Making an assignment generally costs power and/or spectrum. For a channel that can be tracked, the channel state typically does not vary much over such a short time. Hence, ideally it would be preferable to combine the two assignments into one assignment over a single frame.

It should be noted without limitation or loss of generality at this juncture, that the claimed subject matter employs the terms "users" and "flows" interchangeably, and that in general, a user can have or be associated with multiple flows; but for convenience of exposition, the claimed subject matter is explicated, for the most part, in terms of instances where a user has or is associated with one flow. Accordingly, if one considers a wireless cellular network that has to distribute bandwidth and power across n users and if it is assumed that the available transmit power is distributed uniformly across the entire bandwidth (e.g., distribution of power is not optimized across the bandwidth) such a situation is typically suboptimal, but nevertheless, adoption of such a strategy can reduce computational complexity significantly. Moreover, for systems like Ultra Mobile Broadband (UMB) with hybrid automatic repeat request (HARQ) transmissions, the issue of determining optimal transmit powers can be an intractable one. The claimed matter in accordance with one or more aspects overcomes the foregoing short comings by distributing the total bandwidth B across different flows.

Further, for purposes of exposition rather than limitation, if it is assumed that time is slotted, and at each time slot t the signal to noise ratio (SNR) for each flow is known, the signal to noise ratio of flow i at time t can be represented by $\gamma_i(t)$. The spectral efficiency at which data can be transmitted to a flow generally is a function of its signal to noise ratio (SNR) and typically can be given by Shannon's capacity formula. Moreover, in practical wireless systems, the mapping can depend on the set of packet formats (or modulation and/or coding schemes) available for data transmission. Thus, spectral efficiency achievable by flow i at time slot t under the assumption of uniform distribution of power can be denoted as $K_i(t)$.

Figure 3:
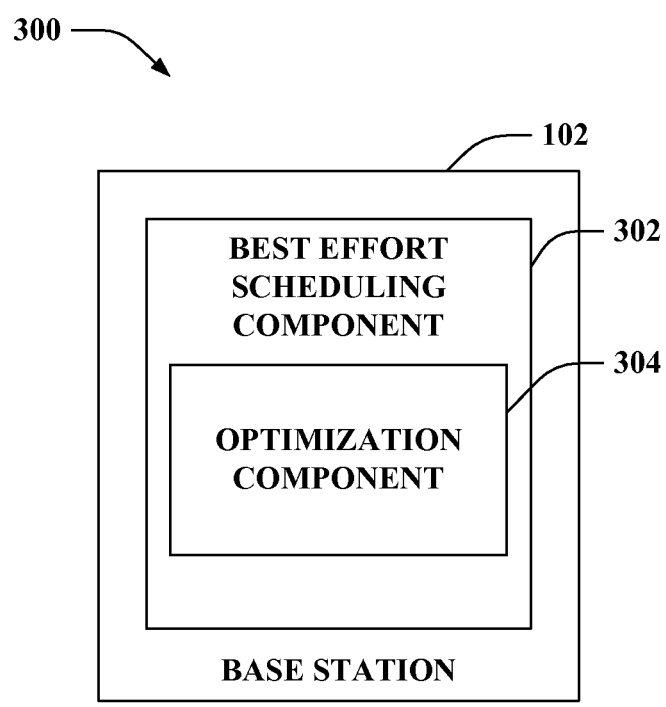
FIG. 3 is an illustration of an example system that effectuates scheduling of best effort flows in a broadband wireless communication environment.

Turning now to FIG. 3 that more particularly depicts 300 an illustrative base station 102 that includes best effort scheduling component 302 and associated optimization component 304. As illustrated, base station 102 utilizes the facilities of best effort scheduling component 302 that in concert with optimization component 304 optimizes bandwidth scheduling across multiple disparate flows, efficiently allocating resources (e.g., bandwidths and/or sub-bands), thereby simultaneously supporting a large number of users and/or diverse flows.

As a preamble to the discussion of the claimed subject matter, for best effort or elastic flows, one can assume that the utility at time slot t for each flow i is typically a concave strictly increasing differentiable utility function $U_i$ of the average rate $x_i(t)$, defined on the positive orthant. Thus, $U_i:(0, \infty) \rightarrow (-\infty, \infty)$. Examples of such utility functions can include $\log x$, $x^a$ for $0<a<1$, and $-x^a$ for $a<0$. The average rate of flow i can be updated as follows:

$$x_i(t+1) = \alpha_i r_i(t+1) + (1-\alpha_i)x_i(t),$$

where $r_i(t)$ is the rate allocated to user i at time slot t, and $0<\alpha_i<1$ is a discounting constant that can be different for each flow i. Further, $1/\alpha_i$ can be termed the time constant for rate averaging wherein the larger the value of $\alpha_i$, the shorter the time horizon over which the user's rate determines its utility.

Accordingly, at each time slot t, the goal of best effort scheduling component 302 in conjunction with optimization component 304 is to compute a resource allocation which maximizes the sum of the utilities, e.g., maximizes:

$$\sum_{i=1}^{n} \frac{1}{\alpha_i} U_i(x_i(t)).$$

The factors $\alpha_i$ rise so that in the long term, best effort scheduling component 302 is not biased towards flows with smaller time constants (e.g., flows which need to be serviced more often). If it is assumed that there is a unique fixed point that ensures that in the long term the sequence of resource allocations converge weakly to one which maximizes:

$$\sum_{i=1}^{n} U_i(x_i(t)),$$

then there also exists of a fixed point for the case where all the α$_i$s are equal.

Where the foregoing holds true, the optimization problem that can be undertaken by best effort scheduling component 302, and in particular, optimization component 304, can be at time slot t to:

$$\text{maximize} \sum_{i=1}^{n} U_i(x_i(t)),$$
$$\text{subject to} \quad x_i(t) \leq \alpha_i K_i(t) b_i + (1-\alpha_i) x_i(t-1),$$
$$\sum_{i=1}^{n} b_i \leq B$$

where $K_i(t)$ is the spectral efficiency that flow i can attain at time slot t—this can depend on the instantaneous signal-to-noise ratio (SNR) of the access device (e.g., access device 116, 122, and 214-232) to which flow i belongs. Variables $x_i$ and $b_i$ denote the amounts of bandwidth allocated to different flows. The optimal solution for the foregoing problem can be characterized by a dual variable ν as follows:

$$b_i = \frac{i}{\alpha_i K_i(t)} \left( U_i^{t-1} \left( \frac{\upsilon}{\alpha_i K_i(t)} \right) - (1-\alpha_i) x_i(t-1) \right)$$

where ν is chosen such that $$\sum_{i=1}^{n} b_i = B.$$

Accordingly, the optimal solution that can be determined by optimization component 304 utilizing a bisection search on ν, where for each iteration of the bisection search entails ascertaining $b_i$ as characterized above, and checking if $$\sum_{i=1}^{n} b_i > B$$

to adjust ν. It should be noted, without limitation or loss of generality, that if B is large, then the optimal solution generated by optimization component 304 can have many flows i where $b_i>0$.

Figure 4:
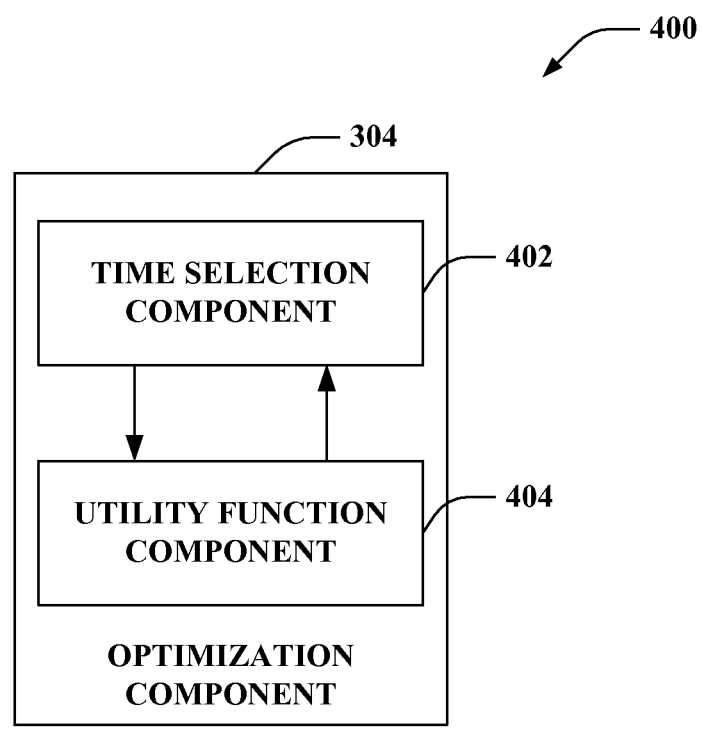
FIG. 4 is a further illustration of an example system that effectuates scheduling of best effort flows in a wireless communication environment in accordance with various aspects of the subject disclosure.

FIG. 4 provides a more detailed depiction 400 of optimization component 304 in accordance with aspects of the claimed subject matter. As illustrated, optimization component 304 can include time selection component 402 and utility function selection component 404 that together can be utilized to optimize bandwidth scheduling over multiple disparate flows. The choice of utility function and time constant can be flow specific and can further depend on the type of flow under consideration. Accordingly, time selection component 402 can appropriately identify time constants pertinent to a particular flow. For instance, selection of large time constants enables optimization component 304 to exploit multiuser diversity easily; while small time constants ensures that a flow is serviced often. For example, for an HTTP flow, a reasonable choice of time constant can be a relatively small time constant of around 200 ms—this ensures that the HTTP flow is serviced and scheduled in the range of every 200-500 ms, and as a result the end user can have a pleasurable interactive experience. On the other hand, for an FTP flow a relatively large time constant can be identified (e.g., on the order of one second) as typically the end user only cares about how fast the entire file gets transferred and not about how often the constituent portions for the transferring file are being sent to the base station.

With regard to utility function selection component 404, bandwidth allocation for given average rates can be determined by derivatives of utility functions—a flow with a higher derivative of utility function can generally be provided a higher priority as illustrated by:

$$b_i = \frac{i}{\alpha_i K_i(t)} \left( U_i^{t-1} \left( \frac{\upsilon}{\alpha_i K_i(t)} \right) - (1-\alpha_i) x_i(t-1) \right)$$

Thus, for example, a FTP flow (associated with a large time constant) should have a utility with a small curvature, because file transfers typically are associated with the transmission of large amounts of data and so the utility seen by the flow diminishes less significantly with higher rates than low rate ping traffic, for instance. Thus, for FTP flows with large time constants, utility function selection component 404 can select utility functions that have a greater tendency to be linear. In contrast, for ping traffic utility function selection component 404 can select utility functions that would be close to one with large derivatives at average rates close to zero (e.g., ensuring that the flow is not starved) but rates close to zero at higher rates. In this context it has been found that where utility function selection component 404 employs utility functions of the form $x^a$ for $0<a<1$ and $-x^a$ for $a<0$, the higher the value of a, the less concave is the utility function. Thus, for ping traffic/flows, utility function selection component 404 can choose small values of a, while for FTP traffic, utility function selection component 404 can select larger values of a.

Figure 5:
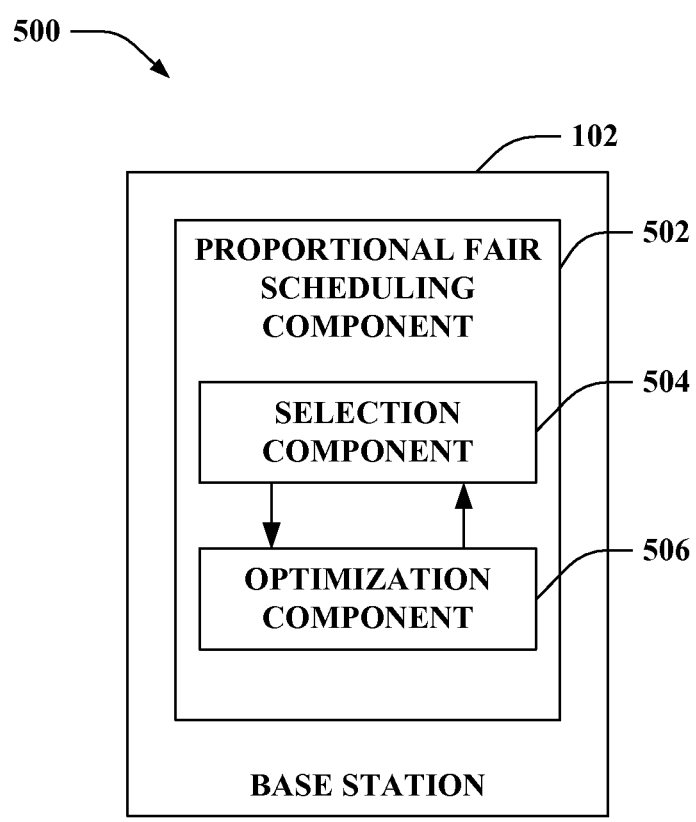
FIG. 5 is yet a further illustration of an example system that effectuates scheduling of best effort flows in accordance with various aspects of the claimed subject matter.

FIG. 5 provides further depiction 500 of an illustrative base station 102 that includes a proportional fair scheduling component 502 together with an associated selection component 504 and optimization component 506 in accordance with an aspect of the claimed subject matter. While proportional fair scheduling component 502, solely for the purposes of exposition, has been depicted as a distinct entity separate unto itself, it will be readily appreciated by those moderately cognizant in this field of endeavor that proportional fair scheduling component 502 can be included in or associated with best effort scheduling component 302. Additionally and/or alternatively, the facilities and/or functionalities associated with proportional fair scheduling component 502 can be subsumed within best effort scheduling component 302.

As illustrated, proportional fair scheduling component 502 can include selection component 504 that in accordance with an aspect of the claimed matter, where a proportionally fair scheduling allocation of resources is required, can select utility functions $U_i$ that are log functions for all flows i. Thus, where the discounting factor (or rate of averaging) $\alpha_i$ approaches zero (e.g., $\alpha_i \to 0$) the optimal policy utilized or developed by optimization component 506 can converge to one, where the entire bandwidth is allocated to the flow with the maximum $K_i(t) U_i'(x_i(t-1))$. Thus, when proportional fair scheduling component 502 (or for that matter best effort scheduling component 302) uses log utilities identified by selection component 504, the entire bandwidth can be allocated to a flow with the maximum $K_i(t)/x_i(t-1)$ in which case only one user with the highest $K_i(t)/x_i(t-1)$ is selected at each time slot t, and is allocated the entire bandwidth B.

Figure 6:
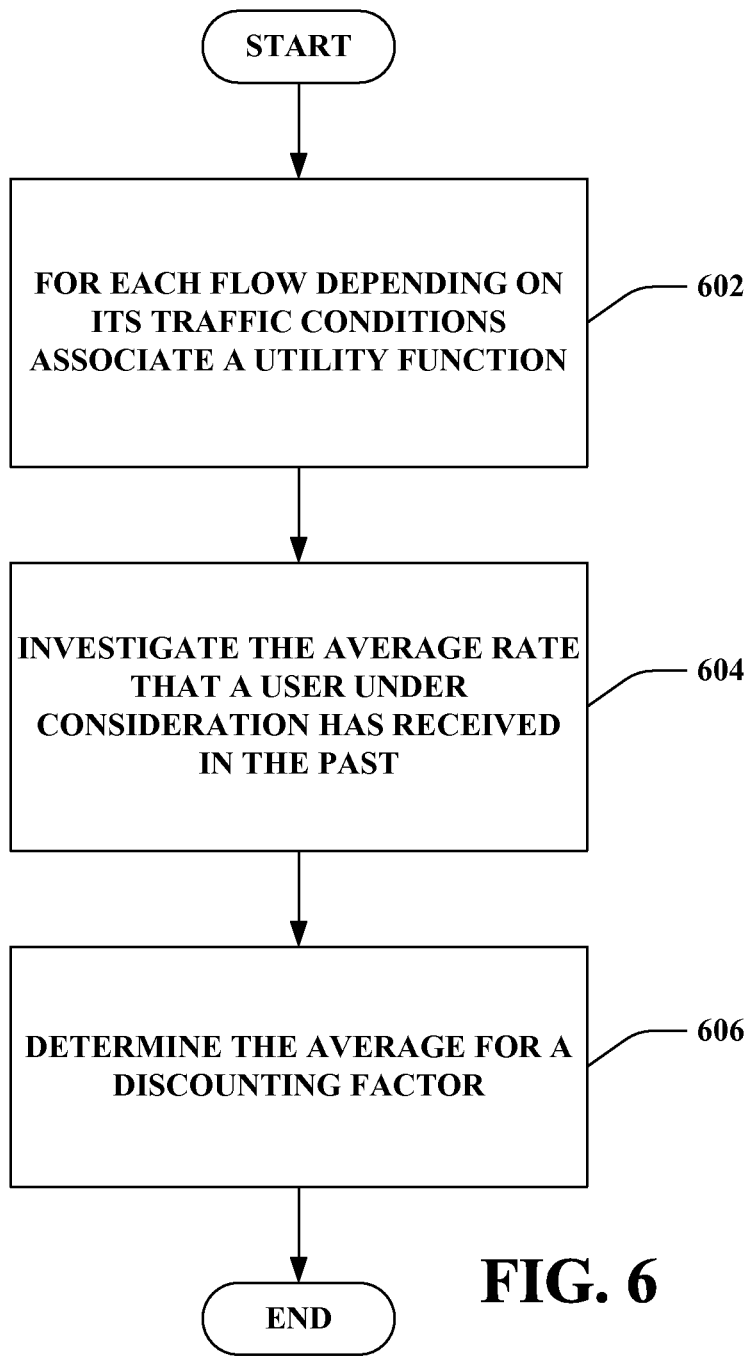
FIG. 6 is an illustration of an example methodology that facilitates the scheduling of best effort flows in a broadband wireless communication environment.

Referring to FIG. 6, a methodology relating to scheduling best effort flows in a broadband wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a further methodology 600 that effectuates scheduling of best effort flows in broadband wireless communication networks. Method 600 can commence at 602 where based at least in part on traffic characteristics, an appropriate utility function can be associated with the each flow. The utility function associated with each flow can be any relevant function, such as log x, $x^a$ for $0<a<1$, or $-x^a$ for $a<0$. Once an appropriate utility function has been associated with each flow based at least in part on the flow's traffic characteristics, method 600 can proceed to 604. At 604 an investigation can be carried out as to the average rate that a user under observation has received so far. Once it has been determined what the average rate that a user has received in the historical past, the method can continue to 606. At 606 a determination can be carried out to ascertain an average for a discounting factor (e.g., $\alpha_i$) in order update the average rate of flow i as represented in the following equation:

$$x_i(t+1)=\alpha_i r_i(t+1)+(1-\alpha_i)x_i(t),$$

where $x_i(t+1)$ represents the average rate computed a time slot t+1, $r_i(t+1)$ denotes the rate at which flow i is allocated at time slot t+1, and $\alpha_i$ is the discounting factor. Thus, as $\alpha_i$ becomes larger there is a greater tendency to discount the rate at which flow i is allocated in successive periods (e.g., t+1, t+2, t+3, ... ).

It will be noted that the discounting factor (or constant) $\alpha_i$ can be associated with disparate flows that require different time constants, and as such can be variable. The variability of $\alpha_i$ is useful because some flows can be more dependant on rates over large expanses of time than others. For example, FTP flows typically only care about how fast the file in its entirety is transmitted rather than how often the constituent portions of the file are being transferred. So in the case of FTP flows a significantly large discounting constant $\alpha_i$ can be utilized. In contrast, HTTP flows are more concerned with how good an end user's interactive experience is, so in this instance a more conservative (and smaller) discounting constant $\alpha_i$ can be employed. Thus, $\alpha_i$ can be used to determine the prospective time horizon of concern based at least in part on the particular flow at issue.

It will be appreciated that, in accordance with one or more aspects described herein, inferences can be made regarding the scheduling of best effort flows in broadband wireless communication networks. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to dividing and employing background and foreground aspects of a scheduling process to effectively and efficiently service multiple disparate flows in a wideband communications network. It will be appreciated that the foregoing example is illustrative in nature and is not intended to limit the number of inferences that can be made or the manner in which such inferences are made in conjunction with the various embodiments and/or methods described herein.

Figure 7:
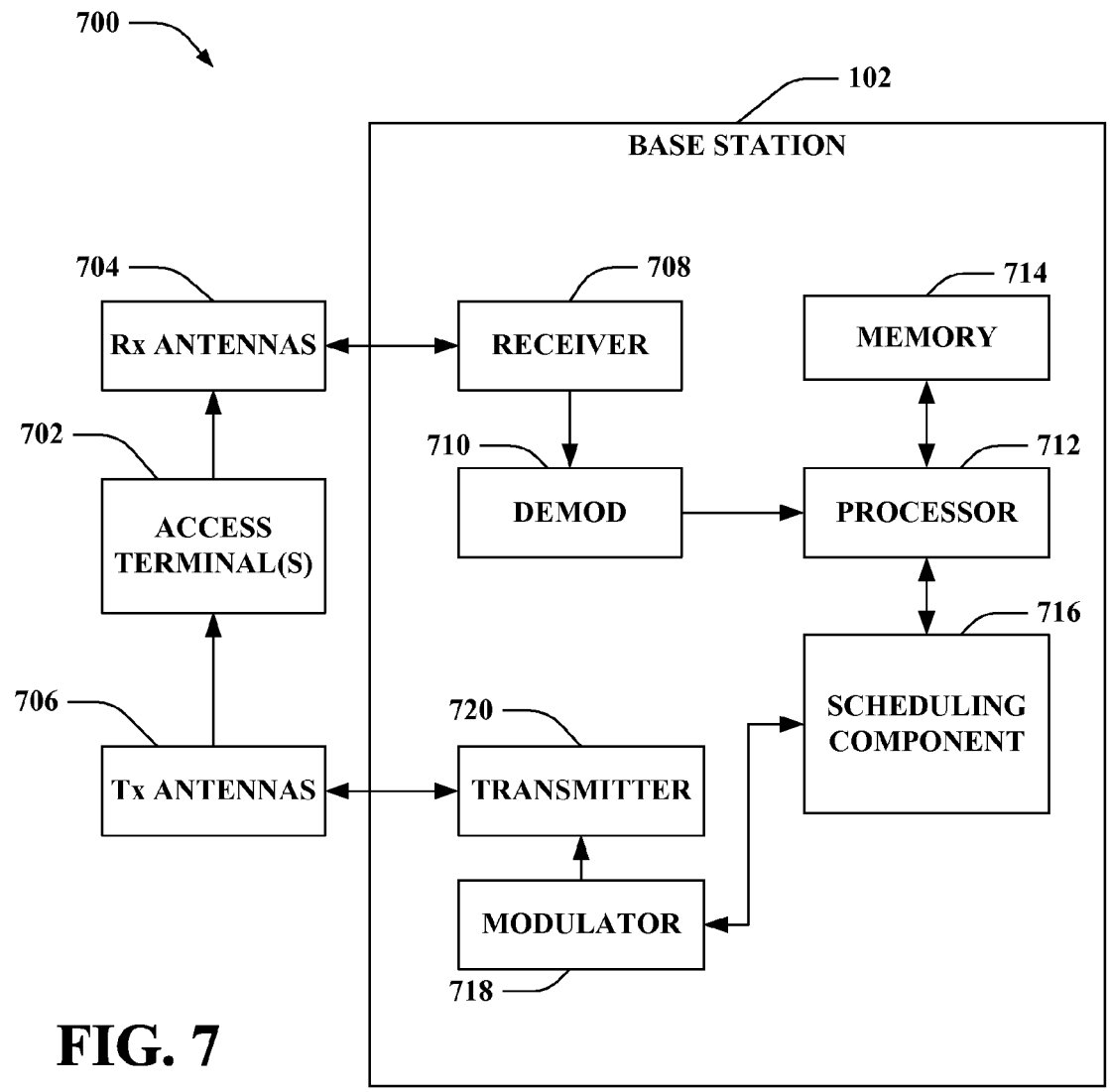
FIG. 7 is an illustration of an example system that facilitates the scheduling of best effort flows in a wireless communication environment.

FIG. 7 is an illustration of a system 700 that facilitates and/or effectuates scheduling of best effort flows in broadband wireless communication networks. System 700 comprises a base station 102 (e.g., access point, ... ) with a receiver 708 that receives signal(s) from one or more access terminals 702 through a plurality of receive antennas 704, and a transmitter 720 that transmits to the one or more access terminals 702 through a transmit antenna 706. Receiver 708 can receive information from receive antennas 704 and is operatively associated with a demodulator 710 that demodulates received information. Demodulated symbols are analyzed by a processor 712 that can be a processor dedicated to analyzing information received by receiver 708 and/or generating information for transmission by a transmitter 720, a processor that controls one or more components of base station 102, and/or a processor that both analyzes information received by receiver 708, generates information for transmission by transmitter 720, and controls one or more components of base station 102, and which is coupled to a memory 714 that stores data to be transmitted to or received from access terminal(s) 702 (or a disparate base station (not shown)) and/or any other suitable information related to performing the various actions and functions set forth herein. Processor 712 is further coupled to a scheduling component 716 that effectuates scheduling of best effort flows in broadband wireless communication networks. Modulator 718 can multiplex a frame for transmission by a transmitter 720 through antennas 706 to access terminal(s) 702. Although depicted as being separate from the processor 712, it is to be appreciated that scheduling component 716 can be part of processor 712 or a number of processors (not shown).

It will be appreciated that the data store (e.g., memory 714) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 714 of the subject systems and methods is intended to comprise, without being limited to, these and any other suitable types of memory.

Figure 8:
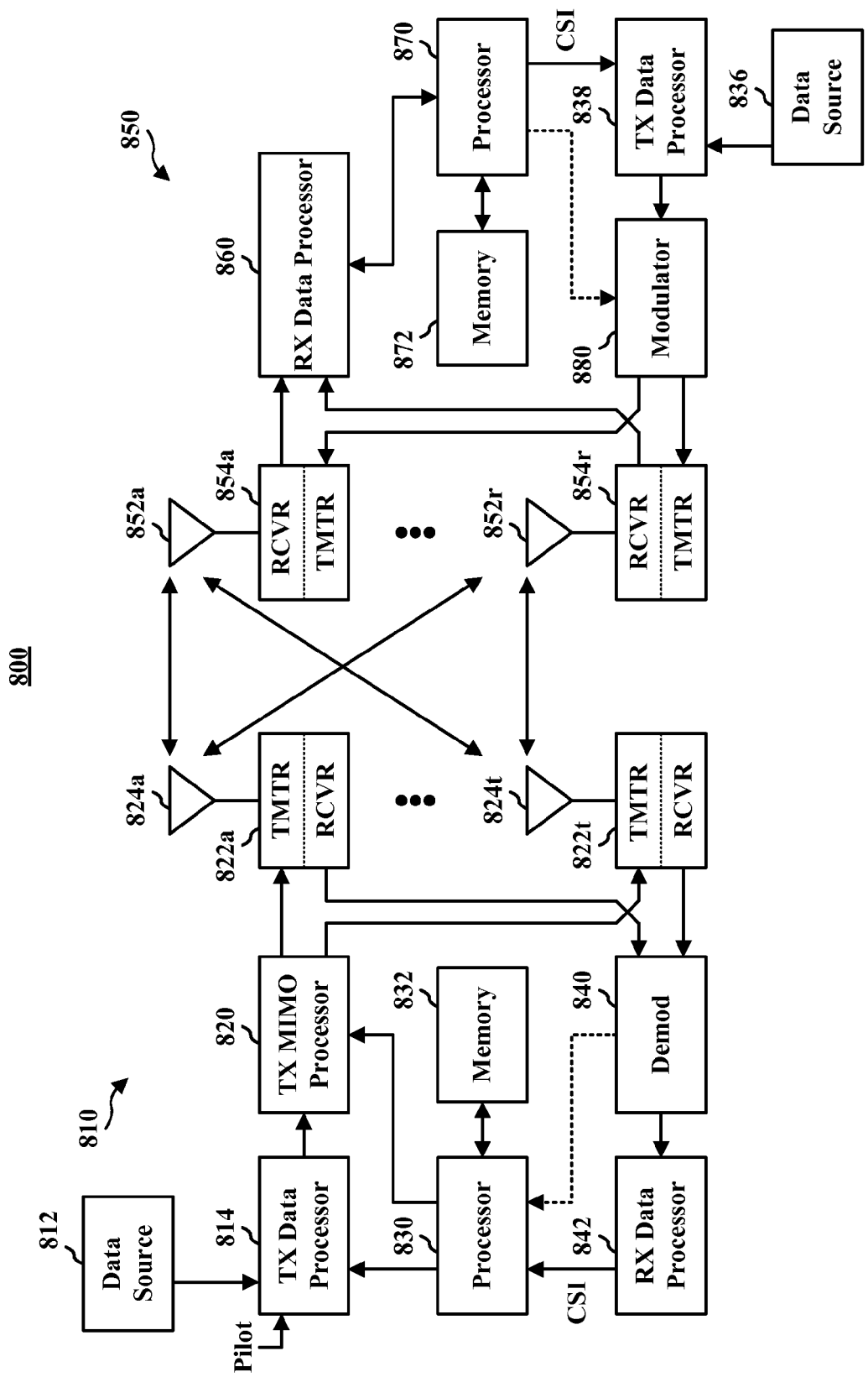
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-5) and/or method (FIG. 6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which precoding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
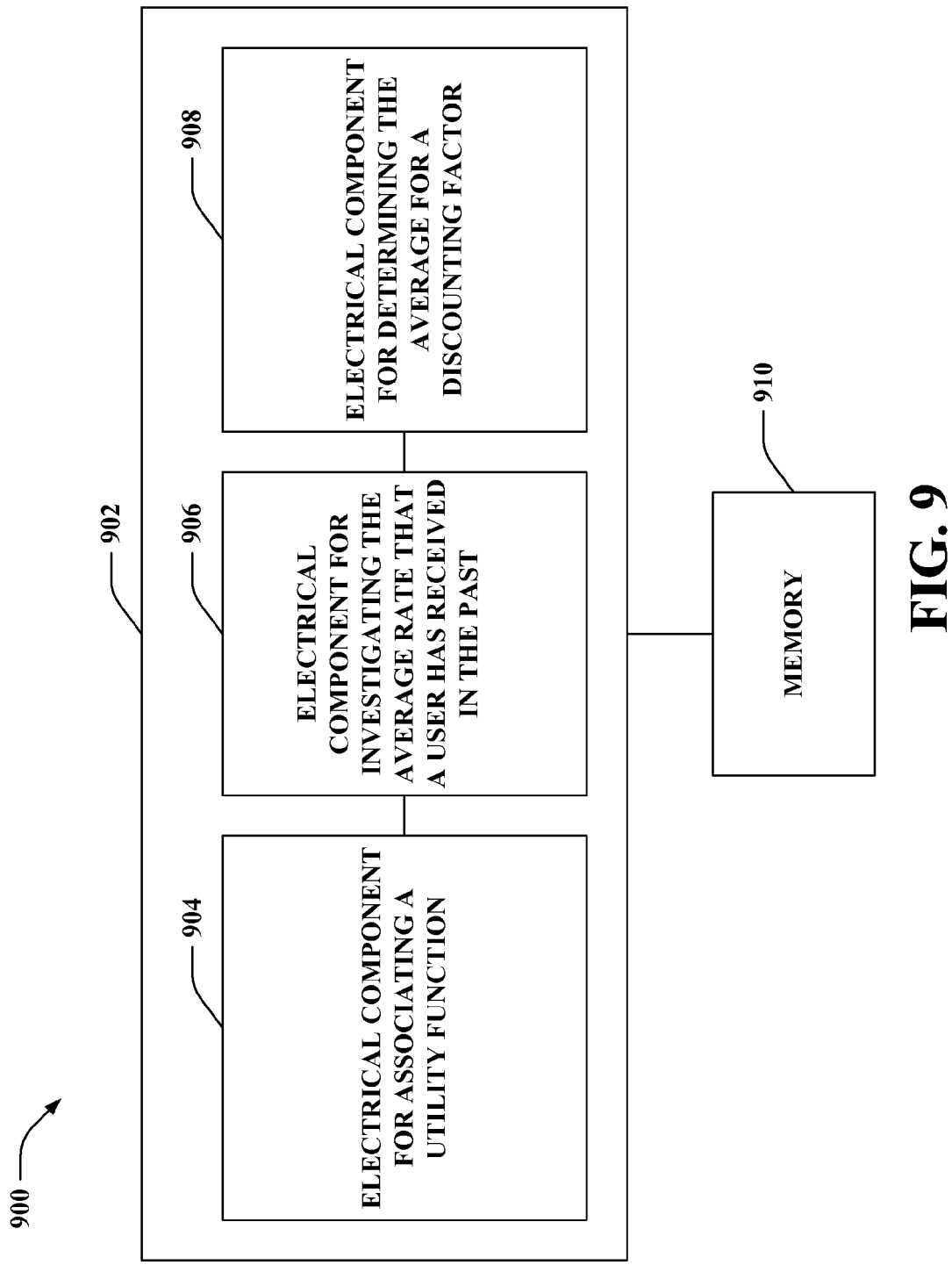
FIG. 9 is an illustration of an example system that enables scheduling of best effort flows in a wireless communication environment.

With reference to FIG. 9, illustrated is a system 900 that effectuates scheduling of best effort flows in broadband wireless communication networks. For example, system 900 can reside at least partially within a base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for selecting or identifying prospective time horizons 904. Further, logical grouping 902 can include an electrical component for determining bandwidth targets over selected or identified prospective time horizons 906. Moreover, logical grouping 902 can comprise an electrical component for employing bandwidth targets in concert with other information to allocate resources 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus operable in a wireless broadband communication system, the apparatus comprising:
    a processor configured for:
        associating a utility function to each of a plurality of flows based at least in part on traffic conditions of a respective flow extant in the wireless broadband communication system,
        investigating, for each of the flows, an average rate that the flow has been serviced by the apparatus in the past,
        utilizing a discounting factor for each of the flows to discount the average rate that the flow has been serviced by the apparatus in the past, wherein the discounting factor for each of the flows determines a time horizon over which the flow is scheduled, and wherein the discounting factor is variable across the flows based at least in part on a type of service associated with the flow, and wherein the discounting factor is determined based on how often the type of service associated with the flow needs to be serviced, and
        utilizing, for each of the flows, the utility function associated with the flow and the discounted average rate that the flow has been serviced by the apparatus in the past to schedule the flow; and
    a memory coupled to the processor for persisting data.

2. The apparatus of claim 1, wherein the type of service associated with each of the flows includes at least one of hypertext transfer protocol (HTTP) traffic, file transfer protocol (FTP) traffic, or voice traffic.

3. The apparatus of claim 1, wherein the utility function associated with each of the flows is employed as a measure of the value of attaining a target average rate over the time horizon.

4. The apparatus of claim 1, further comprising selecting a bandwidth target for each of the flows that maximizes the utility function associated with the flow at the completion of the time horizon.

5. The apparatus of claim 1, wherein utilizing the utility function to schedule the flows comprises allocating a portion of total bandwidth in the wireless broadband communication system at successive time slots to each of the flows based on the utility function associated with the flow and the discounted average rate that the flow has been serviced by the apparatus in the past.

6. The apparatus of claim 1, wherein utilizing the discounting factor for each of the flows to discount the average rate that the flow has been serviced by the apparatus in the past comprises further discounting the average rate that the flow has been serviced in the past as the discounting factor increases.

7. An apparatus operable in a wireless wideband communication system, the apparatus comprising:
  a memory that retains instructions related to:
    associating a utility function to each of a plurality of flows based at least in part on traffic conditions of a respective flow extant in the wireless wideband communication system,
    investigating, for each of the flows, an average rate that the flow has been serviced by the apparatus in the past,
    utilizing a discounting factor for each of the flows to discount previous values of the average rate that the flow has been serviced by the apparatus in the past, wherein the discounting factor for each of the flows determines a time horizon over which the flow is scheduled, and wherein the discounting factor is variable across the flows based at least in part on a type of service associated with the flow, and wherein the discounting factor is determined based on how often the type of service associated with the flow needs to be serviced, and
    utilizing, for each of the flows, the utility function associated with the flow and the discounted average rate that the flow has been serviced by the apparatus in the past to schedule the flow; and
  a processor, coupled to the memory, configured to execute the instructions retained in the memory.

8. The apparatus of claim 7, wherein the type of service associated with each of the flows includes at least one of hypertext transfer protocol (HTTP) traffic, file transfer protocol (FTP) traffic, or voice traffic.

9. The apparatus of claim 7, wherein the utility function associated with each of the flows is employed as a measure of the value of attaining a target average rate over the time horizon.

10. The apparatus of claim 7, further comprising selecting a bandwidth target for each of the flows that maximizes the utility function associated with the flow at the completion of the time horizon.

11. The apparatus of claim 7, wherein utilizing the utility function to schedule the flows comprises allocating a portion of total bandwidth in the wireless wideband communication system at successive time slots to each of the flows based on the utility function associated with the flow and the discounted average rate that the flow has been serviced by the apparatus in the past.

12. The apparatus of claim 7, wherein utilizing the discounting factor for each of the flows to discount the average rate that the flow has been serviced by the apparatus in the past comprises further discounting the average rate that the flow has been serviced in the past as the discounting factor increases.

13. A non-transitory machine-readable medium having stored thereon machine-executable instructions, when executed by a processor, for:
  associating a utility function to each of a plurality of flows based at least in part on traffic conditions of a respective flow extant in a wireless broadband communication system;
  investigating, for each of the flows, an average rate that the flow has been serviced in the past by an apparatus included in the wireless broadband communication system;
  utilizing a discounting factor for each of the flows to discount previous values of the average rate that the flow has been serviced by the apparatus in the past, wherein the discounting factor for each of the flows determines a time horizon over which the flow is scheduled, and wherein the discounting factor is variable across the flows based at least in part on a type of service associated with the flow, and wherein the discounting factor is determined based on how often the type of service associated with the flow needs to be serviced; and
  utilizing, for each of the flows, the utility function associated with the flow and the discounted average rate that the flow has been serviced by the apparatus in the past to schedule the flow.

14. The non-transitory machine readable medium of claim 13, wherein the type of service associated with each of the flows includes at least one of hypertext transfer protocol (HTTP) traffic, file transfer protocol (FTP) traffic, or voice traffic.

15. The non-transitory machine readable medium of claim 13, wherein the utility function associated with each of the flows is employed as a measure of the value of attaining a target average rate over the time horizon.

16. The non-transitory machine readable medium of claim 13, further comprising selecting a bandwidth target for each of the flows that maximizes the utility function associated with the flow at the completion of the time horizon.

17. The non-transitory machine-readable medium of claim 13, wherein utilizing the utility function to schedule the flows comprises allocating a portion of total bandwidth in the wireless broadband communication system at successive time slots to each of the flows based on the utility function associated with the flow and the discounted average rate that the flow has been serviced by the apparatus in the past.

18. The non-transitory machine-readable medium of claim 13, wherein utilizing the discounting factor for each of the flows to discount the average rate that the flow has been serviced by the apparatus in the past comprises further discounting the average rate that the flow has been serviced in the past as the discounting factor increases.

19. An apparatus operable in a wireless broadband communication system, the apparatus comprising:
  means for associating a utility function to each of a plurality of flows based at least in part on traffic conditions of a respective flow extant in the wireless broadband communication system;
  means for investigating, for each of the flows, an average rate that the flow has been serviced in the past by the apparatus included in the wireless communication system;
  means for utilizing a discounting factor for each of the flows to discount previous values of the average rate that the flow has been serviced by the apparatus in the past, wherein the discounting factor for each of the flows determines a time horizon over which the flow is scheduled, and wherein the discounting factor is variable across the flows based at least in part on a type of service associated with the flow, and wherein the discounting factor is determined based on how often the type of service associated with the flow needs to be serviced; and
  means for utilizing, for each of the flows, the utility function associated with the flow and the discounted average rate that the flow has been serviced by the apparatus in the past to schedule the flow.

20. The apparatus of claim 19, wherein the type of service associated with each of the flows includes at least one of hypertext transfer protocol (HTTP) traffic, file transfer protocol (FTP) traffic, or voice traffic.

21. The apparatus of claim 19, wherein the utility function associated with each of the flows is employed as a measure of the value of attaining a target average rate over the time horizon.

22. The apparatus of claim 19, further comprising means for selecting a bandwidth target for each of the flows that maximizes the utility function associated with the flow at the completion of the time horizon.

23. The apparatus of claim 19, wherein utilizing the utility function to schedule the flows comprises allocating a portion of total bandwidth in the wireless broadband communication system at the successive time slots to each of the flows based on the utility function associated with the flow and the discounted average rate that the flow has been serviced by the apparatus in the past.

24. The apparatus of claim 19, wherein the means for utilizing the discounting factor for each of the flows to discount the average rate that the flow has been serviced by the apparatus in the past comprises means for further discounting the average rate that the flow has been serviced in the past as the discounting factor increases.

25. A computer program product, comprising a non-transitory computer-readable medium comprising sets of codes for causing a computer to:
   associate a utility function to each of a plurality of flows based at least in part on traffic conditions of a respective flow extant in a wireless broadband communication system;
   investigate, for each of the flows, an average rate that the flow has been serviced by the computer in the past;
   utilize a discounting factor for each of the flows to discount previous values of the average rate that the flow has been serviced by the apparatus in the past, wherein the discounting factor for each of the flows determines a time horizon over which the flow is scheduled, and wherein the discounting factor is variable across the flows based at least in part on a type of service associated with the flow, and wherein the discounting factor is determined based on how often the type of service associated with the flow needs to be serviced; and
   utilize, for each of the flows, the utility function associated with the flow and the discounted average rate that the flow has been serviced by the apparatus in the past to schedule the flow.

26. The computer program product of claim 25, wherein the type of service associated with each of the flows includes at least one of hypertext transfer protocol (HTTP) traffic, file transfer protocol (FTP) traffic, or voice traffic.

27. The computer program product of claim 25, wherein the utility function associated with each of the flows is employed as a measure of the value of attaining a target average rate over the time horizon.

28. The computer program product of claim 25, further comprising selecting a bandwidth target for each of the flows that maximizes the utility function associated with the flow at the completion of the time horizon.

29. The computer program product of claim 25, wherein utilizing the utility function to schedule the flows comprises allocating a portion of total bandwidth in the wireless broadband communication system at successive time slots to each of the flows based on the utility function associated with the flow and the discounted average rate that the flow has been serviced by the apparatus in the past.

30. The computer program product of claim 25, wherein utilizing the discounting factor for each of the flows to discount the average rate that the flow has been serviced by the apparatus in the past comprises further discounting the average rate that the flow has been serviced in the past as the discounting factor increases.

* * * * *